з,117,122
Patented Jan. 7, 1964

3,117,122
SCHIFF BASE OF 4-AMINO-3-ISOXAZOLIDONE AND TEREPHTHALALDEHYDE
Ernst Felder, Milan, Italy, and Hans Suter, Dorflingen, Switzerland, assignors to Bracco Industria Chimica Societa per Azioni, Milan, Italy
No Drawing. Filed Jan. 24, 1962, Ser. No. 168,510
4 Claims. (Cl. 260—240)

This invention relates to a group of therapeutic agents which are compounds of the formula

and salts of such compounds with physiologically tolerated bases.

The compounds of the invention are Schiff bases of D- or D,L-4-amino-3-isoxazolidone and terephthalaldehyde, and the salts thereof with such physiologically tolerated bases as sodium or calcium.

We have found that the novel Schiff bases of our invention are suitable for the treatment of certain infectious diseases. D-4-amino-3-isoxazolidone, a substance from which the Schiff bases of the invention may be prepared, is a known antibacterial agent. The Schiff bases are similarly effective, but they are more stable and are released from the human or animal organism at a slower rate. Their effectiveness is thus extended, and it is possible to maintain a high blood level of the therapeutic agent over a longer period. Yet, the Schiff bases have been found to be well tolerated.

Table I lists certain significant properties of D-4-amino-3-isoxazolidone together with the corresponding properties of the Schiff base of D-4-amino-3-isoxazolidone with terephthalaldehyde, namely $N^4,N^{4'}$-terephthalal-bis-(D-4-amino-3-isoxazolidone).

Table I

| Compound | Toxicity per os | Urinary secretion in rats,[1] percent | Blood level in rats, 8 hours after 100 mg./kg. given orally, γ/ml. |
|---|---|---|---|
| N,N-terephthalal-bis-(D-4-amino-3-isoxazolidone). | LD 50, over 5 g./kg. | 29.6 | 70.4 |
| D-4-amino-3-isoxazolidine. | LD 50, 4.7 g./kg. | 63.3 | 47.8 |

[1] Mean values determined on two groups of three animals each during three days after daily oral application of 100 mg./kg. of the agent tested, and calculated as percentage of the amount of agent ingested. In similar tests on humans, 12% of the Schiff base is excreted.

The Schiff bases of the invention are strongly effective in vitro against *Mycobacterium tuberculosis*, and against the microbes of the pathogenic flora of the urinary tract including strains of *Staphylococcus aureus*, *Escherichia coli*, *Pseudomonas aeruginosa*, and *Pseudomonas vulgaris* which are resistant to other therapeutic agents. The Schiff bases thus are indicated in the treatment of tuberculosis, and they are particularly suitable for the treatment of urinary infections.

Many salts of the Schiff bases of the invention, particularly the calcium salts, are readily soluble in water, and relatively concentrated aqueous solutions of the calcium salt are convenient therapeutic agents.

While the therapeutic effects of the Schiff bases are similar in some aspects to those of 4-amino-3-oxazolidone, the Schiff bases have important advantages. Their antibacterial activity is substantially the same as that of the oxazolidone in equimolecular concentrations. Their toxicity is lower. Their therapeutic index is very high.

1.4 grams of the Schiff bases may be administered orally to adults every day for ten days without undue side effects. No kidney disturbances have been observed.

The following clinical results are characteristic of the novel compounds:

Eleven men and nineteen women suffering from cystitis are treated with $N^4,N^{4'}$-terephthalal-bis-(D-4-amino-3-isoxazolidone). In seventeen of the patients, the cystitis is due to coli bacilli, in seven cases to *Staphylococcus albus*, in three cases to *Proteus vulgaris*. Three patients are suffering from cancer of the urinary bladder and secondary cystitis. Coli bactilli have been isolated from their urinary excretions.

All patients are given four daily doses of 350 mg. each for three days. After a pause of three days, the same dosage is resumed for six additional days.

Satisfactory response to the treatment is ascertained by bacteriological examination in almost all cases. Fifteen days after completion of the treatment, the following findings result from cystoscopic examination and bacteriological tests of the urines:

(a) Pyurea and hematuria have ceased virtually completely in 85% of the patients treated.

(b) All evidence of pathogenic microbes has disappeared in 45% of the cases.

(c) There is no effect or no significant effect on the microbial flora of the intestinal tract. The coli flora particularly is unaffected or not significantly affected.

Although $N^4,N^{4'}$ - terephthalal - bis - (D - 4 - amino-3-isoxazolidone) is a strong bacteriostatic agent, it does not disturb the fungus and microbial flora which is necessary for intestinal digestion and human well being, and which is unfavorably affected by other antibiotic agents.

The Schiff bases of the invention are prepared by condensing 4-amino-3-isoxazolidone with terephthalaldehyde in the mole ratio of two to one. The condensation reaction is preferably performed in solution in a lower alkanol, such as methanol, ethanol, or isopropanol at elevated temperature. The term "elevated temperature" as employed in this specification and the appended claims will be understood to relate to a temperature higher than the usual room temperature of approximately 20° C. In view of the sensitivity of 4-amino-3-oxazolidone to high temperature, the maximum reaction temperature should be lower than 100° C., but a minimum temperature of 40° C. is preferred to hasten the condensation reaction. When employing the aforementioned lower alkanol solvents, we preferably perform the reaction at a temperature above 40° C., but not higher than the boiling point of the solvent.

The following examples illustrate the method of preparing the Schiff bases of the invention, but the invention is not limited to the specific features chosen for the disclosure.

EXAMPLE I $N^4,N^{4'}$-Terephthalal-Bis-(D-4-Amino-3-Isoxazolidone)

53.6 grams of pure terephthalaldehyde are dissolved in 3,000 milliliters methanol, and the solution is heated to boiling. 85.7 grams highly purified D-4-amino-3-isoxazolidone are suspended in about 600 milliliters methanol and added to the aldehyde solution with rapid agitation. The isoxazolidone is employed in excess over the stoichiometric amount. The mixture is kept at boiling temperature for about two minutes, and then chilled to about 0° C. as rapidly as possible. Stirring is continued at the low temperature for one to two hours.

A precipitate forms and is separated from the liquid by suction filtration. The precipitate is washed with cold methanol and with cold water. The water is removed as thoroughly as possible, and the washed precipitate is again washed with boiling methanol. It is finally dried in a vacuum oven at about 40° C.

Yield: 114.6 grams, which is 94% of the theoretical yield on the basis of the aldehyde used.

The compound decomposes and melts at 204 to 205° C. The melting point is not very clearly observed. $[\alpha]_D^{20} = +160°$ (c.=1.00 in 1 N sodium hydroxide solution).

The Schiff base prepared by the above method is only sparingly soluble in water and most common organic solvents. It is soluble in dimethylformamide and dimethylsulfoxide. The sodium and calcium salts are readily soluble in water.

EXAMPLE II $N^4,N^{4'}$-Terephthalal-Bis-(D,L-4-Amino-3-Isoxazolidone)

22.45 grams D,L-4-amino-3-isoxazolidone are suspended in 200 milliliters 95% ethanol. The suspension is cooled with ice, and 17.5 grams diethylamine are added. The isoxazolidone dissolves to form its soluble diethylammonium salt. A solution of 13.4 grams terephthalaldehyde in 200 milliliters ethanol is added with stirring. The mixture obtained is heated about ten minutes to 45° C. It is then cooled to approximately 0° C. A 2-normal solution of glacial acetic acid in 95% ethanol is added with strong agitation until a pH value of 6.5–7 is reached.

The precipitate formed is filtered with suction. The precipitate on the filter is washed with 95% ethanol and dried. 24.1 grams of $N^4,N^{4'}$-terephthalal-bis-(D,L-4-amino-3-isoxazolidone) are obtained. The compound darkens at 200–210° C. and melts with decomposition at 250–253° C. The solubility of the compound and of its salts is not significantly different from the solubility of the corresponding products of Example I.

EXAMPLE III

Calcium Salt of $N^4,N^{4'}$-Terephthalal-Bis-(D-4-Amino-3-Isoxazolidone)

15 grams $N^4,N^{4'}$-terephthalal-bis-(D-4-amino-3-isoxazolidone) are added to a calcium hydroxide suspension at 40° C. The suspension is prepared by dispersing 3 grams of pure, finely powdered calcium oxide in 120 milliliters water and briefly heating the mixture to boiling. The turbid solution obtained is filtered with filter paper pulp and a clear solution results.

Approximately 250 milliliters isopropanol are added to the solution to precipitate the calcium salt of the Schiff base. The mixture is permitted to stand at 0° C. for four hours. The salt is separated from the liquid by filtration with suction, and is washed with isopropanol.

17.5 to 18 grams of the calcium salt of the Schiff base are prepared in this manner. The salt contains 4 moles of crystal water.

Calculated calcium content: 9.72 percent
Calcium found by analysis: 9.47 percent When the salt is dried in a high vacuum at 80° C., it loses its crystal water, but recovers it on standing in moist air.

The calcium salt is readily soluble in water. 9 grams of the salt dissolve in 100 milliliters water at 25° C.

EXAMPLE IV

Sodium Salt of $N^4,N^{4'}$-Terephthalal-Bis-(D-4-Amino-3-Isoxazolidone)

6.04 grams $N^4,N^{4'}$-terephthalal-bis-(D-4-amino-3-isoxazolidone) are suspended in 15 milliliters of water, and 10 milliliters 4 N sodium hydroxide solution are added. The slightly turbid solution is filtered. 400 milliliters isopropanol are gradually added to the clear filtrate to precipitate the sodium salt which is filtered off with suction, washed with isopropanol, and dried in a vacuum at 40° C. over phosphorus pentoxide.

About 7 grams of the sodium salt of $N^4,N^{4'}$-terephthalal-bis-(D-4-amino-3-isoxazolidone) are obtained as crystals containing 2 moles of crystal water. The crystal water content is 9.4 percent. The salt is readily soluble in water. It decomposes on heating without showing a characteristic melting point or melting range. $[\alpha]_D^{20} = +138±1°$ ( c.=1.0, in water).

EXAMPLE V

Direct Preparation of the Calcium Salt of $N^4,N^{4'}$-Terephthalal-Bis-(D-4-Amino-3-Isoxazolidone) From D-4-Amino-3-Isoxazolidone A suspension of calcium hydroxide in water is prepared by dispersing 7.5 grams of finely powdered calcium oxide in 200 milliliters water, and by heating the dispersion to the boiling point for a brief period. The suspension is cooled to 40° C., and 25.5 grams D-4-amino-3-isoxazolidone are added. The resulting mixture is permitted to stand at 40° C. for ten minutes, whereupon 15.9 grams terephthaladehyde are added. A clear solution is obtained which is mixed with 30 milliliters isopropanol and heated to 50° C. The somewhat turbid mixture is filtered after 15 minutes, and the residue is washed with 50 milliliters water. The calcium salt formed is precipitated from the filtrate by the gradual addition of about 750 milliliters isopropanol and by letting the mixture stand for several hours. The precipitate is filtered off, washed with isopropanol, and dried at 40° C. in a vacuum in the presence of phosphorus pentoxide. 46.6 grams of the calcium salt of $N^4,N^{4'}$-terephthalal-bis-(D-4-amino-3-isoxazolidone) containing four moles of crystal water are obtained. The compound decomposes on heating without showing a characteristic melting point. Its specific rotation is $[\alpha]_D^{20} = +137±1°$ (c.=1, in water).

The compound contains 17.5 percent of crystal water. The results of microanalysis of the compound, and the calculated values for $C_{14}H_{12}CaN_4O_4 \cdot 4H_2O$ are as follows:

Calculated: C, 40.77; H, 4.89; N, 13.59; Ca, 9.72
Found: C, 39.24; H, 5.09; N, 12.92; Ca, 9.47

When the precipitate obtained in the above reaction is dried in a vacuum of 14 millimeters in the absence of phosphorus pentoxide at ambient temperature, there is obtained the corresponding hexahydrate containing 24.1 percent crystal water.

The following examples are illustrative of the preparation of tablets and injectable compositions containing the antibacterial agents of the invention.

EXAMPLE VI

A tableting composition is prepared from the following ingredients:

500.0 grams calcium salt of N,N-terephthalal-bis-(D-4-amino-3-isoxazolidone)
40.0 grams corn starch
10.0 grams paratalcum (90% talcum+10% vaselin oil)
78.5 grams pre-granulated lactose
1.5 grams magnesium stearate USP XV The calcium salt, starch, and paratalcum are sifted through a screen having 64 openings per square centimeter. The lactose is added with stirring to the sifted material, and the resulting mixture is passed through a screen having 34 apertures per square centimeter. Tablets are formed from the screened mixture. They are crushed and the material obtained is screened through a screen having 59 apertures per square centimeter. The magnesium stearate is added last and the mixture is agitated to make it homogeneous. It is then tableted on a conventional press to form 1,000 tablets. Each tablet weighs 0.63 gram and contains 0.5 gram of the calcium salt of $N^4,N^{4'}$-terephthalal-bis-(D-4-amino-3-isoxazolidone).

EXAMPLE VII

Tablets containing $N^4,N^{4'}$-terephthalal-bis-(D-4-amino-3-isoxazolidone) are prepared in a manner analogous to the method employed in Example VII to the following compositions:

|  | Composition VIIa | Composition VIIb |
|---|---|---|
| $N^4,N^{4'}$-terephthal-bis-(D-4-amino-3-isoxazolidone) | 0.25 | 0.3 |
| Phenylazodiaminopyridine | | 0.05 |
| Pre-granulated lactose | 0.04 | 0.018 |
| Corn starch | 0.02 | 0.02 |
| Talcum | 0.01 | 0.10 |
| Stearic acid | 0.002 | 0.002 |
| Total weight per tablet, grams | 0.322 | 0.490 |

Composition VIIb illustrates the joint use of a Schiff base of the invention with another antimicrobial agent for synergistic effects in infections of the urinary tract.

EXAMPLE VIII 50.0 grams calcium salt of $N^4,N^{4'}$-terephthalal-bis-(D-4-amino-3-isoxazolidone) are dissolved at 10° under a nitrogen atmosphere in sterile, double distilled, pyrogen-free water, and the concentrate initially formed is made up to one liter with sterile, double distilled, pyrogen-free water. The solution is filtered through a sterile glass fiber filter of very small pore size by suction. The filtrate is cooled to −45° C. and lyophilized. The lyophilized dry product is distributed in vials in amounts of 0.5 gram each under sterile conditions, and the vials are sealed. Prior to injection, the lyophilized solids are dissolved in 10 milliliters sterile, pyrogen-free, double distilled water in the usual manner.

While the invention has been described with particular reference to specific embodiments, it is to be understood that it is not limited thereto, but is to be construed broadly and restricted solely by the scope of the appended claims.

What we claim is:
1. The Schiff base having the formula

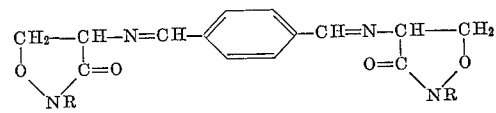

wherein R is a member selected from the group consisting of hydrogen, sodium, and calcium.

2. $N^4,N^{4'}$-terephthalal - bis - (D-4-amino-3-isoxazolidone).

3. $N^4,N^{4'}$-terephthalal-bis-(D,L-4-amino - 3 - isoxazolidone).

4. The calcium salt of $N^4,N^{4'}$-terephthalal-bis-(D-4-amino-3-isoxazolidone).

References Cited in the file of this patent
UNITED STATES PATENTS

| 2,040,183 | Ostromislensky | May 12, 1936 |
| 2,500,111 | Anish et al. | Mar. 7, 1950 |
| 2,801,248 | Folkers | July 30, 1957 |
| 2,892,753 | Schmidt et al. | June 30, 1959 |
| 2,971,004 | Hodge | Feb. 7, 1961 |
| 2,973,358 | Pugin | Feb. 28, 1961 |

OTHER REFERENCES

Adams et al.: JACS, vol. 45, pp. 521–527, QD 1 A5 (1923).